United States Patent [19]

Timm et al.

[11] Patent Number: 4,556,488
[45] Date of Patent: Dec. 3, 1985

[54] APPARATUS FOR FILTERING AND SEPARATING LIQUID AND GASEOUS MEDIA

[75] Inventors: Hans Timm; Heinz Griesbach, both of Geesthacht, Fed. Rep. of Germany

[73] Assignee: GKSS-Forschungszentrum Geesthacht GmbH, Geesthacht-Tesperhude, Fed. Rep. of Germany

[21] Appl. No.: 608,904

[22] Filed: May 10, 1984

[30] Foreign Application Priority Data

May 13, 1983 [DE] Fed. Rep. of Germany ....... 3317517

[51] Int. Cl.$^4$ ............................................. B01D 13/00
[52] U.S. Cl. .............................. 210/321.1; 210/433.2; 210/347
[58] Field of Search ..................... 210/650, 652, 321.1, 210/651, 232, 323.1, 433.2, 347

[56] References Cited

U.S. PATENT DOCUMENTS 3,592,763  7/1971  Tulin ............................ 210/321.1 X
4,228,014  10/1980  Timm et al. ................. 210/433.2 X

FOREIGN PATENT DOCUMENTS 2652605  6/1977  Fed. Rep. of Germany ..... 210/34.1
2945317  5/1981  Fed. Rep. of Germany .

Primary Examiner—Charles Hart
Attorney, Agent, or Firm—James E. Nilles

[57] ABSTRACT

For filtering and separating liquid and gaseous media, particularly for water desalinization by reverse osmosis, modules filled with membrane cushions are employed that are open at two opposite sides and are inundated within an outer housing by an entering medium. The medium which enters into the interior of the membrane cushion is led away by means of aligned cushion holes and a conduit located in these holes. According to the invention, it is proposed that where there is a tandem series of several membrane cushion modules in a common housing, the stacked modules not be connected securely to one another and that a turbulence producing gap between them be permitted so that undesirable operational behavior does not occur in the form of pressure waves, pressure surges and blockage action with changes in the rate of flow and particularly upon starting the system for the first time.

4 Claims, 6 Drawing Figures

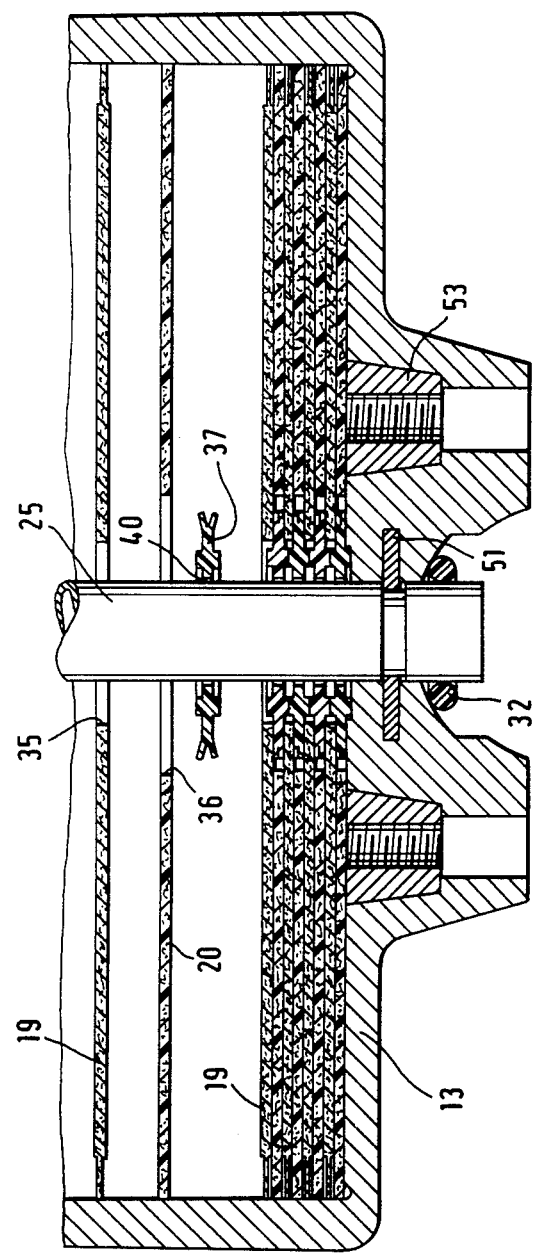

APPARATUS FOR FILTERING AND SEPARATING LIQUID AND GASEOUS MEDIA

This invention relates to an apparatus for filtering and separating liquid and gaseous media, particularly for water desalinization and water purification by reverse osmosis and ultrafiltration with a plurality of trough-shaped inner housings which are arranged in tandem in an outer housing and which are open at both ends and closed with a cover, each containing a plurality of flat-lying membrane cushions stacked atop one another between which lie point-shaped spacers, whereby the medium which flows into the trough-shaped cross-section flows over the external surfaces of the cushions and the medium that contacts the inner surfaces of the membrane flows through bores which extend through the stack of membrane cushions and through tubular bolts arranged in these bores to an outlet duct which extends longitudinally in the outer housing.

The above described devices for filtering and separating are known, for example, from the West German Pat. No. 29 45 317 of the applicant.

The prior devices for filtering and separating of the type mentioned above often show an undesirable operational behavior upon changes in the rate of flow, particularly upon initial activation of the system, in the form of pressure waves, pressure surges and blockages which, according to the inventor's present knowledge, can be traced back essentially to the laminarity of the flow provided at the inlet side of the apparatus.

It is the object of the invention to eliminate the aforementioned disadvantages.

To solve the above described problem it is proposed, according to the invention, that the adjacent inner housings, which are connected in series, be connected individually, each only by means of its duct-like bolt, with a common outlet duct, and that the inner housings not be further connected with one another. By this measure, the stable middle path of flow which otherwise results from tight connection of the inner housing is interrupted so that a certain turbulence results. It is especially advantageous when, according to an additional characteristic of the invention, the length of the membrane stack in the direction of flow is smaller than the axial extension of the inner housing which contains it. In this way a turbulence-producing gap can also result between two adjacent trough-shaped inner housings.

Additional characteristics of the invention will be understood from the dependent claims.

In the following description, a preferred example of the embodiment of the invention is explained in detail with reference to the accompanying drawings.

In the drawings:

FIG. 6 is an enlarged fragmentary sectional view through FIG. 2.

Figure 1:
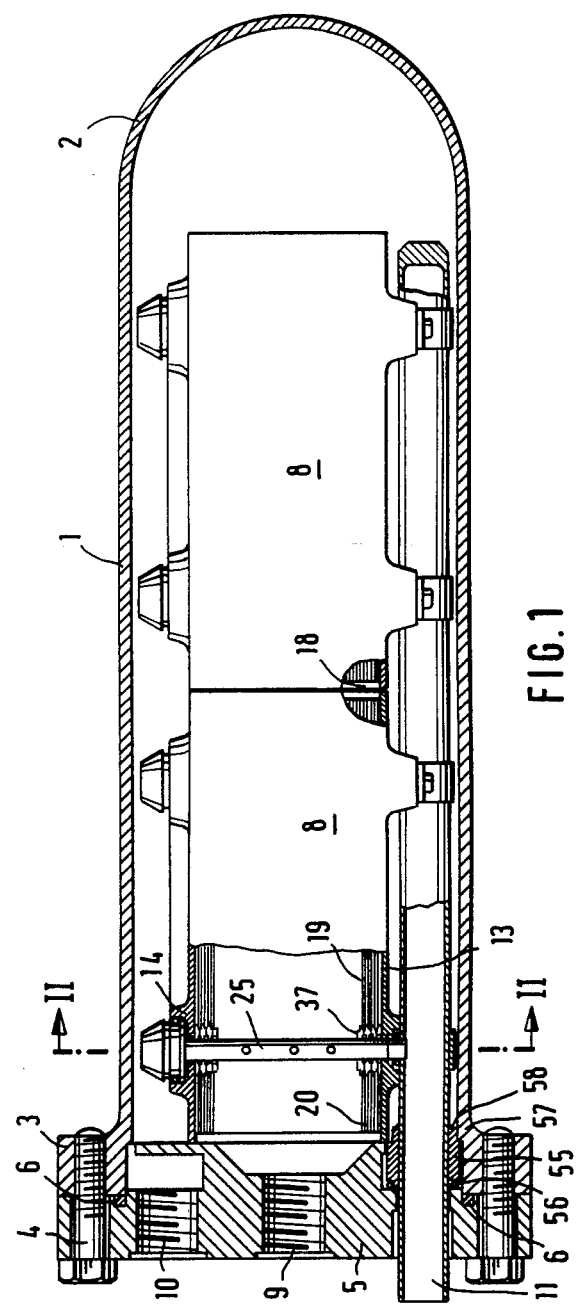
FIG. 1 is an axial section of an apparatus for filtering and separating liquid and gaseous media according to the invention.

The apparatus according to the invention represented in an axial section in FIG. 1 consists of a tubular outer housing 1, which is closed at one end by a cupola-shaped bottom 2. At the open end of the outer housing 1 is an annular flange 3 for a cover 5 that is secured with screw-bolts 4 and in which are located the raw water inlet connection 10, the brine outlet connection 9 and the discharge outlet for the permeate outlet duct 11. Since the connections 9 and 10 are on the same level relative to the representation in FIG. 1, the raw water inlet 10 in FIG. 1 is shown shifted by 90°. Between cover 5 and outer housing 1 is an annular seal 6.

In the interior of the outer housing 1 are located the modular inner housings 8, each of which contains a stack of membrane cushions 19.

Each of these inner housings 8 is composed of a trough-like base 13, which can be closed at its top by a flat cover 14. The inner housing 8 is open in its front thereby forming a passage of box-shaped cross section. The individual inner housings 8 are not directly connected to one another; rather each inner housing is itself carried by the permeate outlet duct 11.

Figure 2:
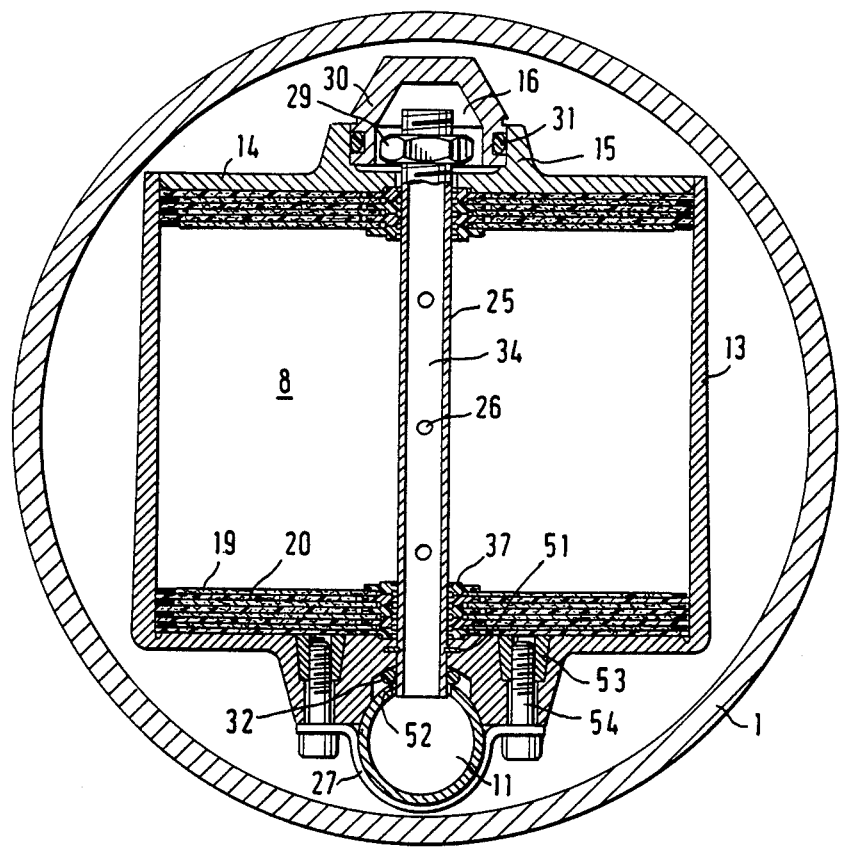
FIG. 2 is a cross-section on the section line II—II in FIG. 1 on an enlarged scale.
Figure 3:
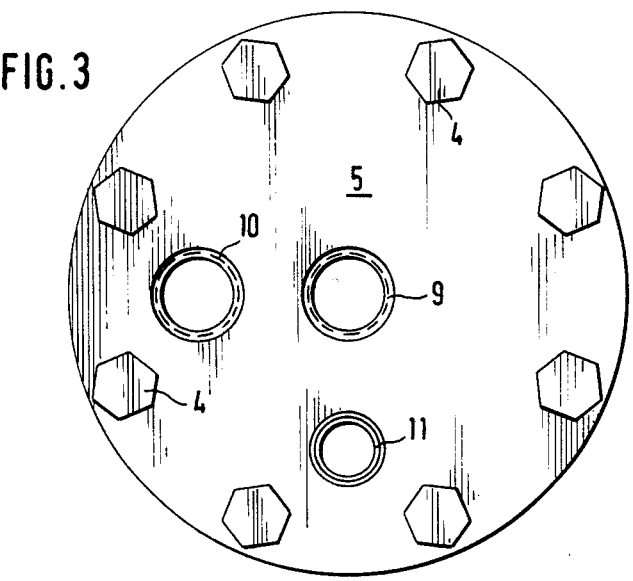
FIG. 3 is a front view of FIG. 1 as seen from the left.
Figure 4:
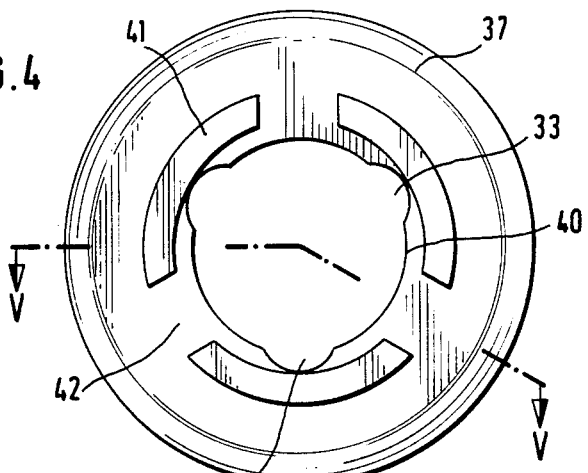
FIG. 4 is a top view of a spacer ring situated between the membrane cushions.
Figure 5:
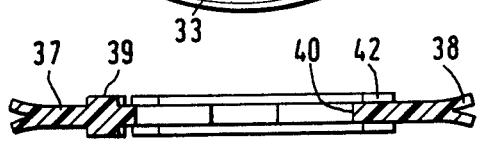
FIG. 5 is a section on the section line V—V in FIG. 4.

The interior space of the base 13, which is bounded by the cover 14, is completely filled by the stack of membrane cushions 19 and the spacers 20 lying between them. Each individual membrane cushion consists preferably of five layers, namely two outer membrane layers, two drainage layers respectively lying under them, and a separation layer in the middle. These five layers are sealingly connected to one another at their edges. These five layers are preferably composed of materials that are very compatible for being bonded together, particularly of related plastics which can be bonded in five stacked layers by ultrasound. Each individual membrane cushion 19 contains two central openings 35 just as two central openings 36 are provided for each spacer 20 in order to be able to stack construction elements 19 and 20 atop two tubular central bolts 25. These central bolts 25 are securely anchored in the housing base 13 by a securement ring 51 so that they can serve as a locating device. As FIG. 2 shows, a nut 29 can be screwed onto the top open end of the tubular bolt 25 in order to move the cover 14 in the direction of the housing base 13 and clamp together the membranes lying between them. It is possible to clamp the membranes together without damage because of the employment of support rings 37 which likewise surround the tubular central bolts 25 and rest in the central openings 36 of the spacers 20. As FIGS. 4 and 5 show, the support rings 37 have upper and lower ring parts 39 which are composed of several segments 41. The maximum thickness of the support ring 37 corresponds to the thickness measurement of membrane cushion 19 plus spacer 20. Thus, the nut 29 (FIG. 2) can be tightened until the ring parts 39 of the support rings 37 fit securely together. In this condition, the spread-apart lip seal 38 provides for a sealing engagement against related membrane layers of two adjacent membrane cushions which, as FIG. 6 clearly shows, extend more closely to the central bolts 25 than the spacers 20. The central opening 40 of the support ring 37 deviates from the circular form. The inner opening of the support ring 37 is in fact constructed so that it can fit the central bolt 25 closely but so that it has three radial enlargements 33 that are spaced around the circumference, so that the permeate within the individual membrane cushions which flows in the direction of the central bolt 25 can reach the exterior surface of the central bolt 25 by way of the passage 42 between segments 41 and the radial enlargements 33 in order finally, to be able to enter into the radial bores 26 of the tubular central bolts, which have axial bores 34.

As FIG. 2 shows, the cover 14 of the inner housing carries a ring-shaped collar 15 in which a covering cap 30 can be inserted and sealed with an annular seal 31. The tubular central bolt 25 is likewise open at its top end. From the exterior of the tube 25 the permeate can reach this top opening in the central bolt radially by way of passages in cover 14. The purpose of this connection between the flowing materials is to prevent an otherwise possible contamination or accumulation of germs in the area of the location device in the interior 16 of the covering cap 30.

The bottom end of the tubular central bolt 25 carries a sealing ring 32 which additionally serves as a spacer. The configuration and dimensioning of the housing base 13 is so designed as to permit the bottom, free end of the tubular central bolt 25 to be set into a corresponding radial bore 52 of the permeate outlet duct 11. At two opposite sides of the central bolt 25 in the housing base 13 are two nuts 53 into which can be threaded bolts 54 that respectively serve as fasteners for a strap 27. When the bolts 54 are completely screwed in the inner housing 8 sits snugly on the permeate outlet duct 11, and the annular seal 32 is thereby so strongly compressed that a tight seal is achieved at the junction of tube 25 and duct 11.

As FIG. 1 shows, the modular interior housings 8 are fastened onto the tube 11 with the straps 27 so that they fit snugly next to one another and also so that the inner housing 8 that is farthest to the left in FIG. 1 can be brought to fit snugly against the inside of the cover in front of the brine outlet 9.

The individual membrane cushions preferably have a rectangular shape with a length which is preferably twice as long as the width. In this case, each individual membrane cushion and each individual spacer has two holes, 35 and 36 respectively. These holes are so located that for each individual particle of flowing material that penetrates into the inside of the cushion from the outside, there is, at the center, practically an equally long path for the flowing material to the tubular central bolts 25. Thus, when the format of a membrane cushion is a×2a, the central holes of the cushion have a distance from one another that is equal to a and have a distance of a/2 from each edge.

In a test installation, 45 membrane cushions 19 and 46 spacers 20 lying between them were, by way of example, arranged in an interior housing of 200×100×100 mm. From this there is available a working surface of almost 2 m².

During operation in the case of water desalinization, the raw saltwater is led to connection 10. From there the natural water flows in the outer housing 1, outside the modular inner housing 8, to the bottom 2 of the outer housing, and then from there to flow in the opposite direction through the inner cross-section of the inner housings 8, the two opposite ends of which are open and trough-shaped. In this way the raw water flows over all of the exteriors of the membrane surfaces of the individual membrane cushions. The raw water that does not go through the membranes can again leave at outlet 9 as strongly enriched brine. The desalinized water that has entered the individual membrane cushions flows inside each individual cushion by way of the radial passages of the support ring 37 and the radial bores 26 and into the tubular bolts 25 in order to finally reach the permeate outlet duct 11.

An especially simple assembly of the apparatus according to the invention is possible when an annular seal carrier 55 is set securely on the permeate outlet duct 11. This seal carrier carries the annular seal 56 and provides for the prescribed axial spacing of the individual structural elements of the apparatus. In assembled condition the annular seal 56 fits snugly against the cover 5 and the duct 11. At the rear a step surface 58 of the seal carrier engages a corresponding complementary built out step 57 in the outer housing 1.

When cover 5 is removed, the permeate outlet duct 11 can be drawn out with all of the inner housings 8 that are fastened to it, in order to exchange an individual inner housing or all of them, or to provide new membrane stacks, as may be necessary. Since the inner housings 8 are not connected to one another, it is enough to loosen the respective bolts 54 and to remove the interior housings 8 from the permeate outlet duct 11. The connection points of the inner housings 8 defined by the radial bores in the outlet duct 11 are so chosen that, upon secure engagement of the abutments 57/58, the inner housing 8 that is the farthest left fits snugly against the inner side of the cover 5 of the system so that the raw water inlet 10 and brine outlet 9 are separated from one another.

The foregoing description relates essentially to water desalinization by reverse osmosis. However, the subject matter of the invention is not restricted to this employment, for the apparatus according to the invention is generally designed for filtering and separating of any liquid and gaseous media by means of reverse osmosis and ultrafiltration.

It is of special importance to the present invention that, above all under high pressures and high rates of flow, everthing that can lead to a pronounced laminar flow is avoided. An especially distinct laminarity can lead to the destruction of the membrane stack, to pressure surges and even to a reverse in the intended physical processes. In this connection the measures according to the invention do not involve connecting the individual inner housings 8 to one another; rather they are fastened to the permeate outlet duct 11 so that they are individually detachable and lengthwise adjacent inner housings 8 are slightly spaced from one another. Not only are there advantages associated with assembly but also with flow technology, since a flow disturbance can arise between the individual modules. In this connection the invention presents one more special advantage when the axial length of the individual membrane cushions is made smaller than the axial length of the interior housings 8, so that a flat, turbulence producing gap 18 results between adjacent interior housings.

We claim:

1. Apparatus for treatment of fluids by filtration and the like, comprising an elongated outer housing which has a closed end and has an inlet for untreated fluid at its opposite end, an outlet duct extending lengthwise in said outer housing, adjacent to one side thereof, having a closed end adjacent to said closed end of the outer housing and having its opposite end accessible at said opposite end of the outer housing, a plurality of elongated inner housing elements arranged lengthwise adjacent to one another in said outer housing, each said inner housing element comprising a substantially trough-shaped body portion that has an opening at one lateral side thereof and a cover that closes said opening, each said inner housing element having opposite open ends through which untreated fluid can flow in the direction away from said closed end of the outer housing successively through said inner housing elements, a stack of substantially flat membrane cushions in each inner housing element that have their surfaces substantially parallel to its length, each said membrane cushion comprising a pair of spaced apart membrane sheets that fluid permeates for treatment and each having a hole therethrough, said cushions being separated by spacers each of which likewise has a hole, and a tubular connector for each said stack extending through said holes and having radial openings through which fluid from between the membrane sheets of each cushion can enter the interior of the connector, each said connector extending across the interior of an inner housing element, through its cover and through the wall of its body portion that is opposite its cover, and being communicated at one end with said outlet duct to discharge treated fluid thereinto, said apparatus being characterized by:

A. means securing each said inner housing element individually and directly to said outlet duct so that the inner housing elements are connected with one another only by said outlet duct; and B. said inner housing elements being secured to said duct in endwise spaced relationship to one another that generates turbulence in untreated fluid flowing successively through them.

2. The apparatus of claim 1 wherein each said tubular connector has an end portion received in a laterally opening hole in said outlet duct and wherein said means securing each inner housing element to the outlet duct comprises clamping means, further characterized by:

a resilient sealing ring surrounding each tubular connector and confined under compression between the outlet duct and the inner housing member to seal the connection between the tubular connector and the outlet duct.

3. The apparatus of claim 1 wherein said means securing each inner housing element to said outlet duct comprises a strap which embraces the outlet duct and which has end portions connected to the inner housing element by screw threaded means whereby said strap is tensioned to clamp the inner housing element against the outlet duct.

4. The apparatus of claim 1 wherein each membrane cushion stack has a length, as measured in the direction lengthwise of the outer housing, which is less than the length of the inner housing element that contains it, so that there are turbulence-producing gaps between membrane cushion stacks in adjacent inner housing elements.

* * * * *